W. G. DAVIS.
SAFETY AUTOMOBILE LOCK.
APPLICATION FILED JUNE 16, 1919. RENEWED FEB. 17, 1921.
1,380,887
Patented June 7, 1921.
2 SHEETS—SHEET 1.
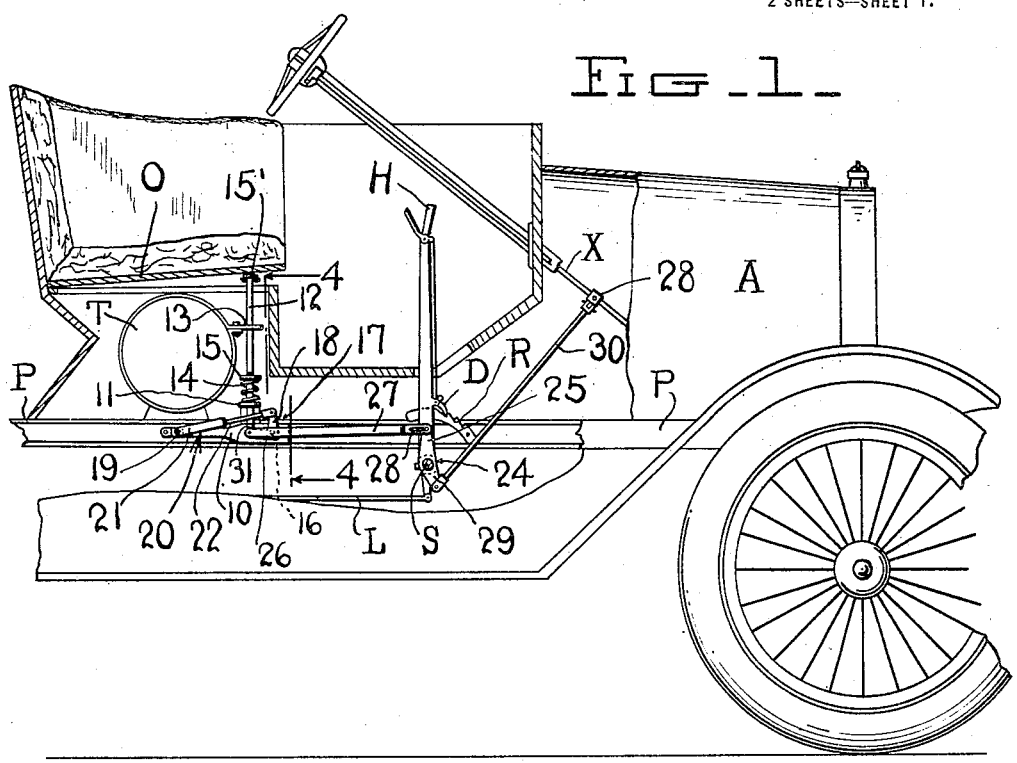
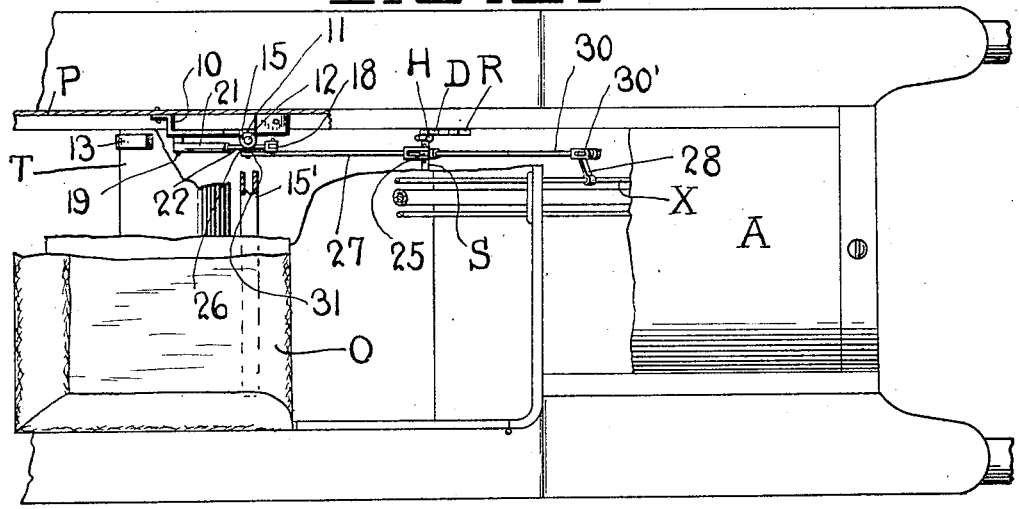
Inventor
W. G. Davis
By A. Milton Buck
Attorney

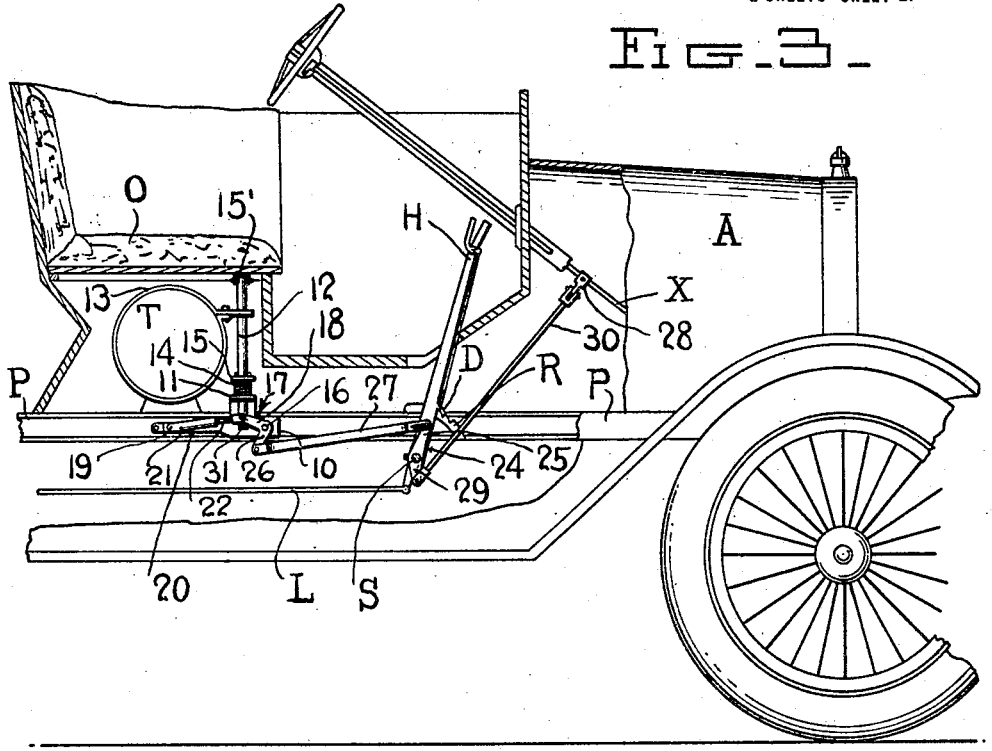
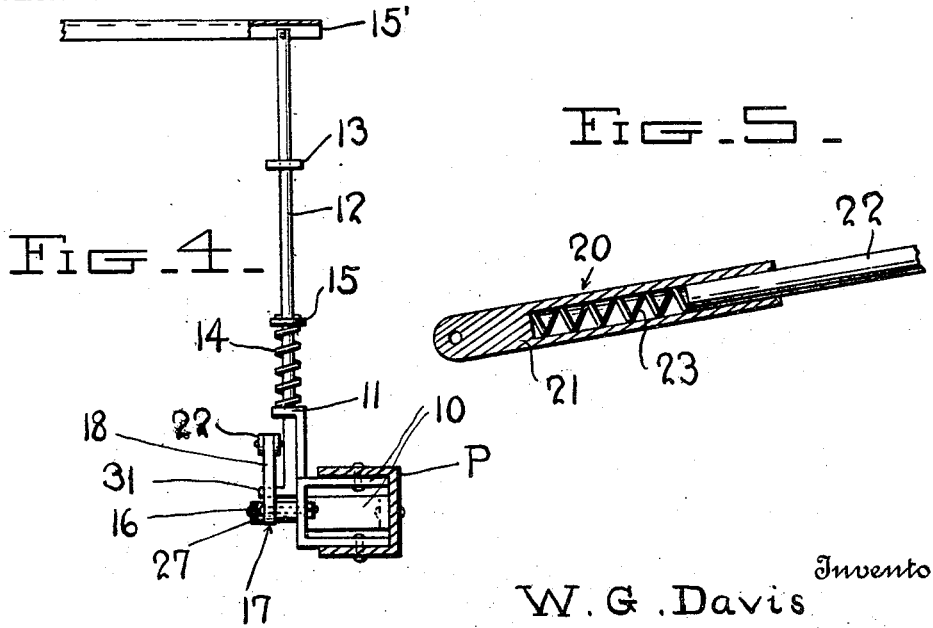

UNITED STATES PATENT OFFICE.

WALTER G. DAVIS, OF MIAMI, FLORIDA.

SAFETY AUTOMOBILE-LOCK.

1,380,887. Specification of Letters Patent. Patented June 7, 1921.

Application filed June 16, 1919, Serial No. 304,669. Renewed February 17, 1921. Serial No. 445,856.

*To all whom it may concern:*

Be it known that I, WALTER G. DAVIS, a citizen of the United States, residing at Miami, in the county of Dade and State of Florida, have invented certain new and useful Improvements in Safety Automobile-Locks, of which the following is a specification.

This invention relates to automobiles and more particularly to an automatic lock therefor.

The primary object of this invention resides in the provision of means for automatically locking an automobile against accidental starting during the absence of the chauffeur from the seat.

Another object of this invention resides in the provision of means for automatically and simultaneously shifting the gears, locking the brakes and controlling the timer of automobiles during the absence of the chauffeur from his seat.

A further object of this invention resides in the provision of means which will control the brakes, gears and timer of an automobile so that the chauffeur can safely crank the engine thereof with the possibility of the automobile running over him entirely eliminated.

A still further object of this invention resides in the provision of means which will control the brakes, gears and timer of an automobile so that the same will be prevented from moving while being cranked and the timer so set that the back fire of the engine will be prevented.

With these and other objects in view this invention resides in certain novel features of construction and arrangement of elements to be more particularly set forth in the specification herewith and pointed out in the appended claims, it being understood that the right is reserved to resort to such changes in construction as come within the scope of the claims.

In the accompanying drawings:—

Figure 1 is a side view of an automobile partly in section showing the elements of this invention attached thereto and disposed in their locked position;

Fig. 2 is a plan view thereof partly in section;

Fig. 3 is a view similar to Fig. 1 with the elements of this invention disposed in released position;

Fig. 4 is an enlarged sectional view on line 4—4 of Fig. 1 with certain portions of the automobile eliminated;

Fig. 5 is a detail sectional view of the expansible link.

In the present embodiment of this invention, the letter A designates an automobile which in this instance is disclosed as being of the "Ford" type having the usual shift rod S that is manipulated by the usual hand brake and gear shift lever H to operate the link L that is connected to the brakes when the chauffeur desires to leave the automobile. The hand brake and gear shift lever H is provided with the usual dog D which coacts with the rack R for retaining it in locked position but on account of its frequence in failing to remain in locked position, the necessity of avoiding the movement of the automobile while being cranked is accomplished by the automatically operated elements to be hereinafter set forth.

To one side rail P of the chassis is rigidly secured a bracket 10 which has an apertured lug 11 formed thereon for slidably guiding a plunger 12 which passes through an apertured bracket 13 that is fastened to the gasolene tank T of the automobile and extends beneath the seat O which is yieldably retained in raised position when unoccupied by a spring 14 surrounding the plunger 12 and bearing between the lug 11 and a collar 15 on the plunger. The aforesaid plunger pivotally supports a substantially U-shaped bearing plate 15' at that end thereof which is adjacent the underside of the seat O so that the depression of any portion of the seat will readily manipulate the plunger.

Pivotally secured to the bracket 10 as at 16 is a rocker arm 17 between the arm 18 of which and to the bolt 19 that is secured to the bracket 10 is secured an expansion link 20 which consists of a tubular member 21, adapted to slidably receive a plunger 22, that is forced toward the bell crank 17 by a coil spring 23 within the tubular member.

Rigidly secured to the shift rod S of the automobile is a double rocker arm 24, between the arm 25 thereof and the arm 26 of the bell crank 17 is pivotally secured a link 27 which is provided with a longitudinally extending slot 28 adjacent that end of the arm 25 of the crank arm 24 for permitting the movement of the shift rod without manipulating the link 27 while the plunger 12 is depressed under the weight of the chauffeur.

Adjustably secured to the rod X of the spark controlling mechanism of the automobile is a crank arm 28, between which and the arm 29 of the rocker arm 24 is pivotally secured a link 30 that is provided with a longitudinally extending slot 30' adjacent that end which is pivotally secured to the crank arm 28 for permitting the usual manipulation of the rod X when the automobile is operated from the seat.

Extending in the path of movement of the arms 18 and 26 of the rocker arm 17 is a lug 31 which is carried by the plunger 12 and is adapted to engage the under edge of the arm 18 of the rocker arm 17 when the seat is raised by the plunger and upon the depression of the plunger the arm 26 of the rocker arm 17 will be moved in contact with the lug 31 whereupon said arm 26 together with the link 30 will be under the influence of the spring 14 when the seat is depressed. Therefore when the chauffeur leaves his seat the plunger 12 will be moved by the spring 14 and the rocker arm 26 manipulated by the aforesaid spring.

Upon referring to Fig. 3 of the drawings it will be noted that the hand brake and gear shift lever together with the spark controlling rod are in released position and the seat depressed for retaining the elements of this invention in released position so that the automobile can be operated in the usual manner. With these elements in this position it will be noted that upon the chauffeur leaving his seat, the plunger 12 will be raised by the spring 14 and the rocker arm 17 will be manipulated by the link 21 which movement of the rocker arm 17 will cause the link 27 to rock the hand brake and gear shift lever to apply the brakes and release the clutch of the engine and since the double rocker arm 24 is carried by the shift rod S it will likewise return the spark controlling rod X to a retarded position through the instrumentality of the link 30 and the crank 28. With the seat depressed the slotted ends of the links 27 and 28 permit the usual manipulation of the shift rod S and spark controlling rod X when the other coacting elements are released or in inoperative position.

With this invention fully set forth it is manifest that an automatic lock is provided for automobiles, which will safely prevent the same from moving during the absence of the chauffeur while the engine continues to run and also avoids accidents due to the spark being improperly advanced and the clutch being applied while cranking the engine.

Having thus described this invention what I claim is:—

1. In combination with an automobile, its seat and spark control rod, of means to pivotally hold said seat, a plunger rod ending in a lug held to said seat, a spring to normally force said rod upward, a belt crank 17 pivotally held adjacent to said lug, a pivotally held rocker arm, a link connecting said rocker arm and crank, said bell crank connected to said plunger rod, a crank arm extending from said control rod, and a link 30 connecting said crank arm to said rocker arm.

2. The combination with the controlling mechanism of an automobile, of a slidable plunger, brackets guiding said plunger, a collar on said plunger, a spring between one of said brackets and collar, a rocker arm pivotally supported by one of said brackets, an expansion link pivoted between one arm of the rocker arm and last mentioned bracket, a double rocker arm carried by certain elements of the controlling mechanism of the automobile and links pivoted to said double rocker arm between the first mentioned rocker arm and other controlling elements of the automobile.

In testimony whereof I affix my signature.

WALTER G. DAVIS.